May 10, 1955    F. B. ANDERSON ET AL    2,707,808
EVAPORATOR DOOR ASSEMBLY
Filed April 16, 1951    3 Sheets-Sheet 1
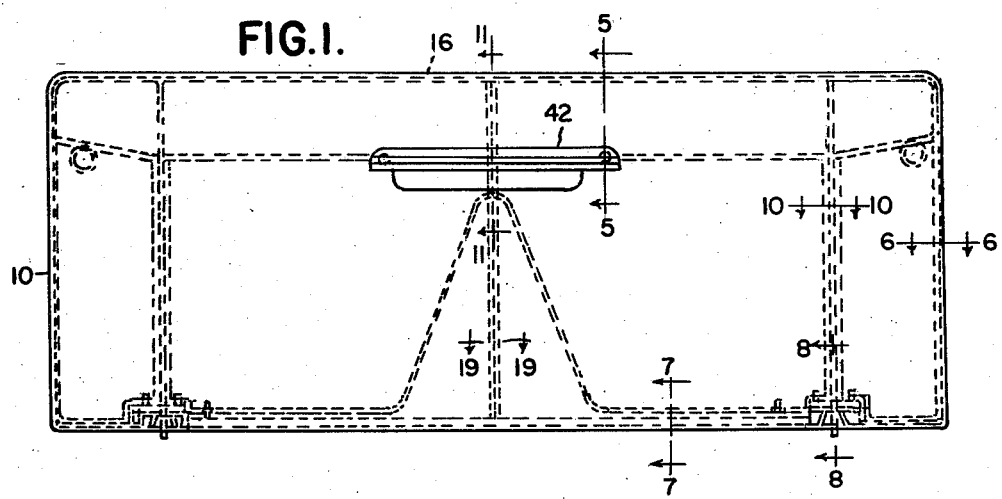
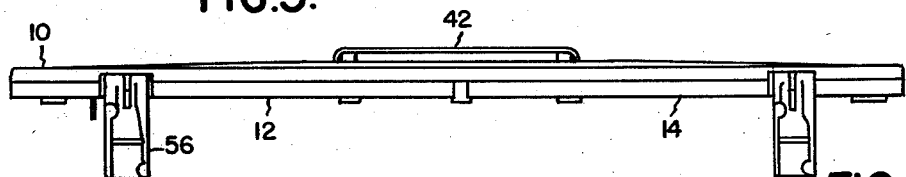
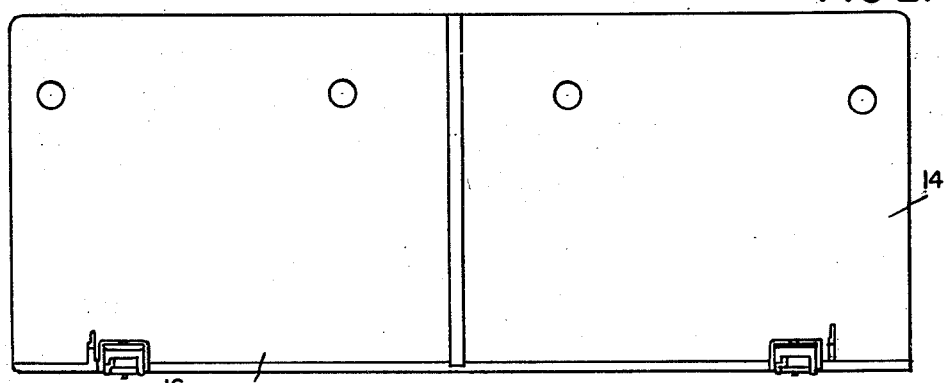
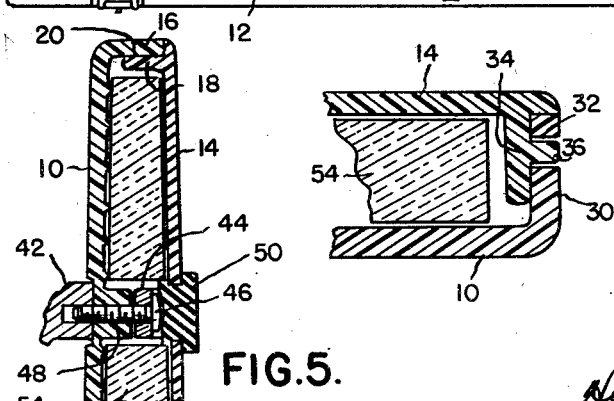
INVENTORS
FLORENCE B. ANDERSON
BY JOSEPH H. KONEFES
ATTORNEYS

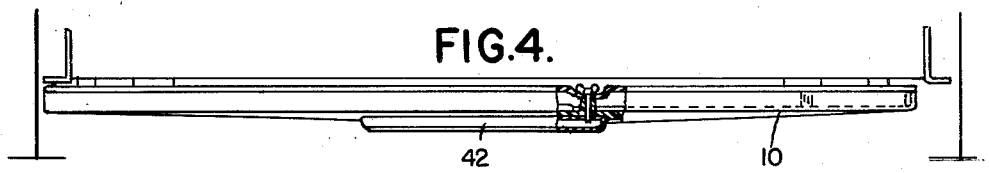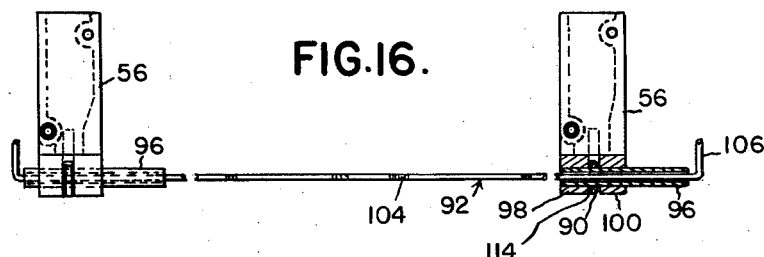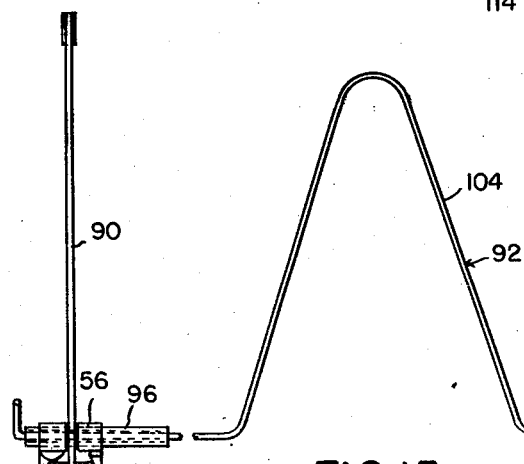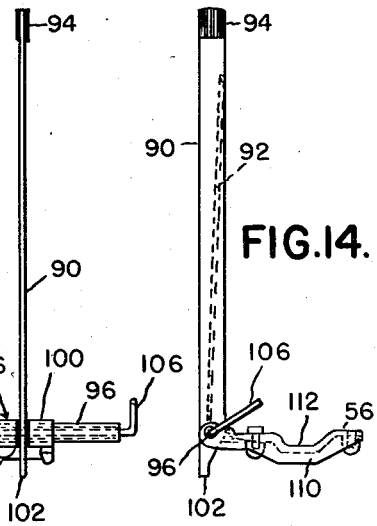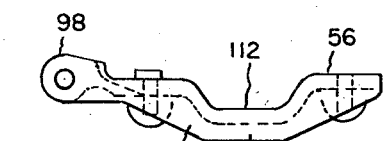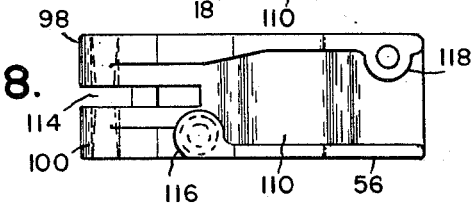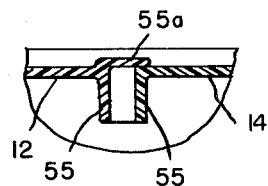

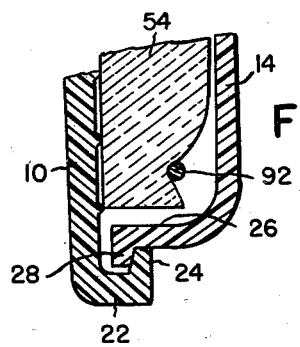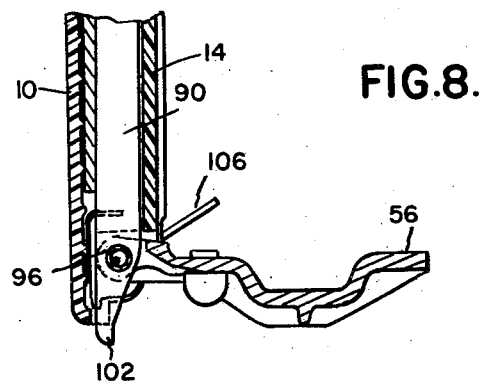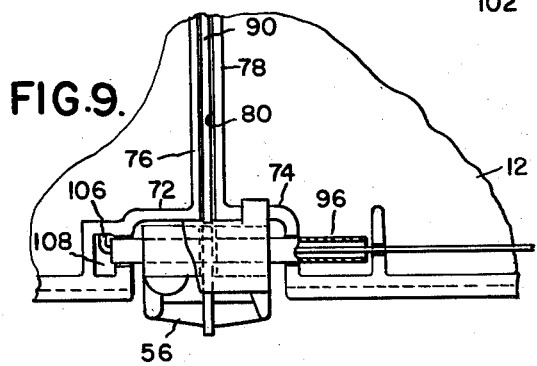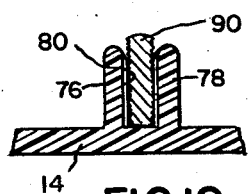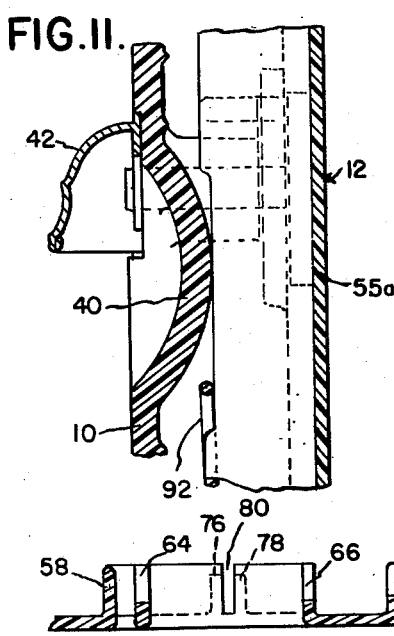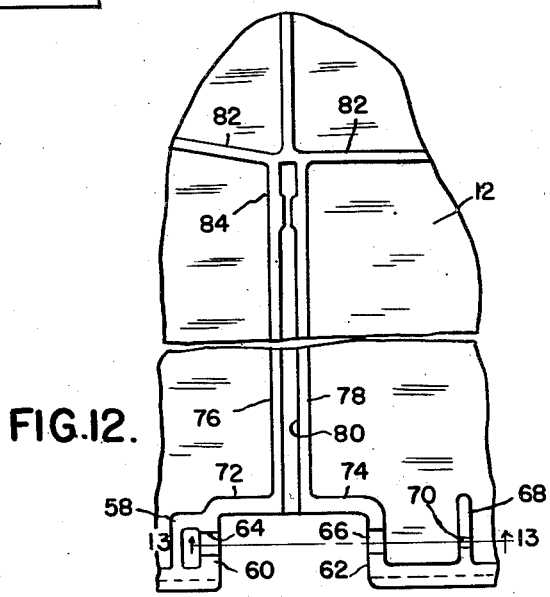

United States Patent Office 2,707,808
Patented May 10, 1955

2,707,808

EVAPORATOR DOOR ASSEMBLY

Florence B. Anderson, Winnetka, and Joseph H. Konefes, Libertyville, Ill., assignors to Motor Products Corporation, Detroit, Mich., a corporation of New York Application April 16, 1951, Serial No. 221,237

15 Claims. (Cl. 20—35)

The present invention relates to the art of refrigeration, and more particularly to an evaporator door assembly for use in closing the front opening into the evaporator in a refrigerator.

It is an object of the present invention to provide an evaporator door assembly composed of a front or outer panel, a pair of rear or inner panel sections, means for interconnecting the panel and panel sections, hinge means for the assembly, spring means for biasing the door to closed position, and a handle including attaching means for the handle which in addition retain the inner panel parts in assembly with respect to the outer panel.

It is a further object of the present invention to provide an evaporator door assembly characterized by its attractive appearance, the efficient operation, the ease with which the parts thereof may be assembled, and the economy with which the structure may be produced.

It is a further object of the present invention to provide an evaporator door assembly comprising plastic panel parts and incorporating a metal stop arm for supporting the door assembly on its hinges, the stop arm including an abutment portion cooperable with the hinge structure to limit opening movement of the door.

It is a further object of the present invention to provide a door assembly comprising a tubular hinge pin, and a closure spring having a portion extending through said tubular pin.

It is a further object of the present invention to provide a door assembly including separate panel parts, one of which is provided with housing structure for direct insertion of hinge and supporting structure, an associated panel part serving as a partial closure for said housing structure.

Other objects and features of the invention will become apparent as the description proceeds, especially when taken in conjunction with the accompanying drawings, wherein:

Figure 1 is a front elevation of the evaporator door assembly.

Figure 2 is a rear elevation of the door assembly.

Figure 3 is a bottom plan view of the door assembly.

Figure 4 is a top plan view of the door assembly with parts in section.

Figure 5 is a fragmentary section on the line 5—5, Figure 1.

Figure 6 is a fragmentary section on the line 6—6, Figure 1.

Figure 7 is a fragmentary section on the line 7—7, Figure 1.

Figure 8 is a fragmentary section on the line 8—8, Figure 1.

Figure 9 is an enlarged fragmentary elevational view with parts in section showing the hinge mounting and connection to one of the rear panel sections.

Figure 10 is a fragmentary section on the line 10—10, Figure 1.

Figure 11 is a fragmentary section on the line 11—11, Figure 1.

Figure 12 is an enlarged elevational view showing the hinge mounting structure provided on the inner surface of one of the inner panel sections.

Figure 13 is a section on the line 13—13, Figure 12.

Figure 14 is a side elevation of the assembly between the hinge, the stop arm, and the closure spring.

Figure 15 is a fragmentary front elevational view of the assembly shown in Figure 14.

Figure 16 is a fragmentary plan view, partly in section, of the sub-assembly shown in Figure 14.

Figure 17 is a side elevational view of the hinge used in the assembly.

Figure 18 is a bottom plan view of the hinge structure shown in Figure 17.

Figure 19 is a fragmentary section on the line 19—19, Figure 1.

The evaporator door construction comprises an outer panel section 10 formed of a suitable plastic material such for example as polystyrene, and a pair of inner panel sections 12 and 14 also formed of a plastic material such for example as polystyrene. The outer panel section 10 is provided along its top with a rearwardly extending flange 16, best seen in Figure 5, and each of the inner panel sections 12 and 14 includes along its top edge a forwardly extending flange 18 spaced downwardly from its edge to provide a seat 20 for the reception of the flange 16.

Along the bottom edge of the outer panel 10, as best seen in Figure 7, there is provided a short rearwardly extending flange 22 terminating at its inner edge in an upwardly extending flange or abutment portion 24 which is continuous along the bottom edge of the panel except in the vicinity of the hinge mountings as will presently appear. The inner panel sections 12 and 14 are provided along their bottom edge with a forwardly extending portion 26 terminating in a downwardly extending flange or abutment portion 28 adapted to seat behind the flange or abutment portion 24 of the outer panel. From the foregoing description it will be apparent that as so far described, each of the inner panel sections partially interlocks with the outer panel but at the same time may be moved horizontally with respect thereto.

The outer panel section 10, as best seen in Figure 6, is provided along its side edges with rearwardly extending flanges 30 provided with spaced openings 32 therein. Each of the inner panel sections 12 and 14 along the edges thereof which in assembly are adjacent the side edges of the outer panel, are provided with forwardly extending flanges 34 spaced inwardly from their side edges, and extending laterally outwardly from the flanges 34 are bosses or abutments 36 which are adapted to be received within the openings 32. Thus, the laterally outer edges of both inner panel sections interlock with the lateral edges of the outer panel in a manner to prevent movement of the inner panel sections away from the outer panel.

As best seen in Figure 11, the outer panel 10 has located centrally thereof and adjacent its upper edge an inwardly recessed portion 40 which cooperates with a metal handle 42 to provide space for receiving the fingers of the operator in opening the door. The inner panel sections 12 and 14, as best seen in Figure 5, include forwardly extending portions 44 having openings therethrough for receiving screws 46 which extend through bosses 48 and thread into suitably threaded recesses at the rear of the ends of the metal handle 42. Preferably, rubber bumper elements 50 are inserted after the screws 46 are tightened to cover the heads of the screws and also to provide resilient abutments which in use are positioned to engage the front edge of the usual shelf (not shown) of the evaporator.

From the foregoing description it will be observed that the screws 46 complete the assembly of the outer panel and the two inner panel sections, and that as a result of the provision of the interlocking abutments provided at the bottom and at the sides of the outer panel, the inner panel sections are thereby finally assembled to the outer panel and retained against movement with respect thereto. Preferably, the interior space between the outer panel and the inner panel sections is provided with suitable insulating material indicated at 54.

Both inner panel sections have forwardly extending flanges 55 at their adajcent vertical edges, and one of the sections, as for example section 12, has a rearwardly offset flange 55a which overlaps the rear surface of panel section 14.

The evaporator door assembly is provided with means for hingedly mounting it to the bottom wall of the evaporator for swinging movement about a horizontal axis. For this purpose each of the inner panel sections 12 and 14 is provided with specially designed ribbing indicated in Figure 9, for the reception of hinges or hinge brackets 56. This structure is shown in greater detail in Figures 12 and 13 where it will be observed that the inner panel sections include ribbing on the face thereof adjacent the outer panel. This ribbing includes an imperforate vertical wall 58 and spaced parallel walls 60 and 62 which are provided with slots 64 and 66. The ribbing also includes a wall 68 having a narrower slot 70 therein. Interconnecting the walls 60 and 62 are a pair of transversely extending walls 72 and 74 which respectively interconnect with the vertically extending ribs 76 and 78. The ribs 76 and 78 are spaced apart to provide a groove or channel 80 therebetween and adjacent the upper portion of the panel sections where the ribs 76 and 78 interconnect with stiffening ribs indicated generally at 82, there is provided a restricted rib section 84 adapted to frictionally engage a stop arm associated with the hinge which will subsequently be described in detail.

Referring now to Figures 14, 15 and 16 the subassembly comprises the hinges 56, stop arms 90, and a closure spring 92. The stop arm 90 is preferably in the form of a flat strip as best seen in Figure 14, and has its upper end knurled as indicated at 94. The knurled portion 94 in assembly with the inner panel sections is pressed into the restricted rib section 84 where it is frictionally locked in position. The sub-assembly includes tubular hinge pins 96 which pass through openings provided adjacent the lower ends of the stop arms 90 and through laterally spaced ears 98 and 100 provided on the hinge 56. Since the stop arm 90 is firmly retained in the assembly composed of the outer panel and the inner panel sections, it will be appreciated that the hinge means for the door assembly is in effect constituted by the pivot connection between the stop arms 90 and the tubular hinge pins 96. Stop arms 90 may be metal or laminated plastic.

As best seen in Figure 14, the stop arm 90 below the pivot connection includes a projecting stop or abutment 102 adapted to engage the underside of the hinge bracket 56 to limit opening movement of the door assembly.

The sub-assembly also includes the closure spring 92 which as illustrated, extends through the tubular hinge pins 96. The spring 92 includes an upwardly formed generally U-shaped portion 104 and its ends are laterally bent as indicated at 106 to provide an anchor for the spring in final assembly. The parts illustrated in the sub-assembly shown in Figures 14–16 may be inserted directly into the ribbing, best illustrated in Figure 12, in an obvious manner. The laterally bent portion 106 of the closure spring extends laterally outwardly through an opening 108, as best illustrated in Figure 9.

Details of the hinge bracket 56 are best illustrated in Figures 17 and 18. The hinge bracket includes a body portion 110 which is curved downwardly to provide space 112 thereabove for the reception of parts of the refrigeration and control system which form no part of the present invention. The bracket includes the two forwardly extending spaced apart ears 98 and 100, the space 114 therebetween being provided for the reception of the stop arm 90. The hinge bracket comprises enlarged embossments 116 and 118 which are tapped for the reception of assembly screws which are extended downwardly through the bottom wall of the evaporator. In final assembly the laterally bent portion 106 of the closure spring is rotated clockwise from the position shown in the sub-assembly of Figure 14 by engagement with the bottom wall of the evaporator, thus tensioning the spring a predetermined amount with the door assembly in closed position. Obviously, opening movement of the door assembly, which is counterclockwise as seen in Figure 14, further tensions the closure spring and renders it effective to close the door and to hold it firmly in closed position.

The drawings and the foregoing specification constitute a description of the improved evaporator door assembly in such full, clear, concise and exact terms as to enable any person skilled in the art to practice the invention, the scope of which is indicated by the appended claims.

What we claim as our invention is:

1. A door construction for the evaporator compartment of a refrigerator comprising a unitary outer panel, an inner panel construction comprising a pair of inner panel parts, guide and support means on the bottom edges of said panel and panel parts supporting said panel parts for lateral sliding movement on said panel, connecting means at the edges of said outer panel and the remote edges of said inner panel parts engageable by movement of each inner panel part relative to said outer panel, and means for securing the adjacent edges of said inner panel parts to said outer panel.

2. A door construction for the evaporator compartment of a refrigerator comprising a unitary outer panel, an inner panel construction comprising a pair of inner panel parts, guide and support means on the bottom edges of said panel and panel parts supporting said panel parts for lateral sliding movement on said panel, connecting means at the side edges of said outer panel and the outer side edges of said inner panel parts engageable by movement of each inner panel part laterally of said outer panel, interfitting means at the inner side of said inner panel parts, and fastening means for securing the inner edges of said inner panel parts to said outer panel.

3. Evaporator door construction comprising a unitary outer panel having rearwardly extending flanges at its side edges, said flanges having series of openings therethrough, a pair of inner panel parts each of which at its outer side edge is provided with outwardly extending projections adapted to fit within said openings, guide and support means on the bottom edges of said panel and panel parts supporting said panel parts for lateral sliding movement on said panel, a handle, and fastening means connecting opposite ends of said handle through said outer panel to the inner panel parts and effective to prevent movement of said projections out of said openings.

4. Structure as defined in claim 3 in which said fastening means comprise screw parts holding said handle, said outer panel and said inner panel parts in assembly.

5. A door comprising an outer panel having a rearwardly extending bottom flange, and rearwardly extending side flanges having openings therein, a pair of inner panels each of which is adapted to overlie substantially a lateral half of said outer panel, said inner panels having laterally projecting lugs at their outer side edges received in said openings, the bottom edges of said inner panels being slidable on the bottom flange of said outer panel, one of said inner panels on its inner side edge having an inwardly offset vertical flange overlying the adjacent edge of said other inner panel to cover the space between said inner panels while providing for relative sliding on the bottom flange of said front panel to provide for insertion and withdrawal of said lugs from said openings.

6. A door as defined in claim 5 in which the bottom flange on said outer panel has an upstanding flange at its inner end, and said inner panels have the bottom edges thereof slidably received on said bottom flange forwardly of said upstanding flange.

7. A door as defined in claim 6 comprising fastening members carried by said outer panel adjacent the center thereof releasably engaging the inner edge portions of said inner panels to hold all of said panels in assembled position.

8. A hinged door construction comprising a single front panel, a rear panel carried by said front panel, said panels being formed of plastic material, one of said panels having its inner surface provided with ribbing defining recesses and grooves open toward the interior of the door, and hinge structure including parts insertable into said recesses and grooves prior to assembly of said panels, said ribbing including a pair of spaced ribs defining a groove therebetween, and said hinge structure comprising a strip received in said groove, said strip having an aperture adjacent one end, and a hinge pin in said aperture connecting said strip to the remaining hinge structure.

9. A construction as defined in claim 8 in which said pair of spaced ribs and said strip extend from adjacent the hinged edge of said door to adjacent the opposite edge thereof.

10. A construction as defined in claim 8 in which said strip has a knurled part adjacent its free end, and said ribs are shaped to engage said knurled part frictionally.

11. A construction as defined in claim 8 in which said strip includes a projection adjacent the aperture therein engageable with the remaining hinge structure to limit opening movement of said door.

12. A hinged door construction comprising a single front panel, a rear panel carried by said front panel, said panels being formed of plastic material, one of said panels having its inner surface provided with ribbing defining recesses and grooves open toward the interior of the door, and hinge structure including parts insertable into said recesses and grooves prior to assembly of said panels, said ribbing being provided at one edge of said one panel adjacent the corners thereof, said hinge structure comprising door parts received in said ribbing and mounting parts, tubular hinge pins connecting said door parts and mounting parts, and spring means comprising an elongated spring having an intermediate portion extending from said tubular hinge pins within the space between said front and rear panels and being laterally bent to engage the inner surface of one of said panels at a point remote from the pivot axis of said pins, the end portions of said spring extending through the tubular pins and outward of the door adjacent said mounting parts.

13. A construction as defined in claim 12, said end portions of said spring projecting outwardly from the interior of said door in a direction such as to require bending thereof to stress said spring upon attachment of the mounting parts to support structure.

14. An evaporator door comprising a unitary outer panel formed of a plastic material and having a bottom seat along its lower edge and having other seats at its opposite ends, a pair of inner panel sections formed of plastic, each having a portion at its lower edge engaging said bottom seat and having projections engaging said other seats, the adjacent edges of said inner panel sections having overlapping portions, a door handle on said outer panel, screws extending forwardly through said inner panel sections into said handle for mounting said handle on said door, said inner panel sections having forwardly recessed portions for receiving said screws, and resilient bumpers in said recessed portions extending rearwardly from said door to cushion closing movement thereof.

15. A hinged door construction comprising separable front and rear panels, one of said panels being formed of plastic material, said one panel having closely spaced parallel ribs defining a narrow groove therebetween, and hinge structure for said door including a metal strip inserted edgewise into the groove prior to assembly of said front and rear panels, said strip serving to distribute forces between the door and remaining hinge structure over widely separated points on said door, and means holding said panels in assembly to thereby retain said strip in said groove.

References Cited in the file of this patent

UNITED STATES PATENTS

| | | |
|---|---|---|
| 416,044 | Wise | Nov. 26, 1889 |
| 2,033,884 | Davison | Mar. 10, 1936 |
| 2,270,407 | Blood et al. | Jan. 20, 1942 |
| 2,378,801 | Sidell et al. | June 19, 1945 |
| 2,571,600 | Nave | Oct. 16, 1951 |
| 2,576,996 | Castedello | Dec. 4, 1951 |